United States Patent
Yamamura et al.

(10) Patent No.: US 6,191,187 B1
(45) Date of Patent: *Feb. 20, 2001

(54) OPTICAL GLASS FIBER COATING COMPOSITIONS

(75) Inventors: Tetsuya Yamamura; Masakatsu Ukon; Zen Komiya, all of Tsukuba; Takashi Ukachi, Ushiku, all of (JP)

(73) Assignees: DSM N.V., Heerlen (NL); JSR Corporation, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/838,848

(22) Filed: Apr. 11, 1997

Related U.S. Application Data

(63) Continuation of application No. PCT/NL95/00348, filed on Oct. 11, 1995.

(30) Foreign Application Priority Data

Oct. 11, 1995 (JP) .................................................. 6-245203

(51) Int. Cl.$^7$ ........................................................ C08F 2/48
(52) U.S. Cl. .................................. 522/96; 522/97; 522/42; 522/120; 522/121; 428/378; 428/380; 428/383
(58) Field of Search .................................. 522/96, 97, 42, 522/120, 121; 428/378, 380, 383

(56) References Cited

U.S. PATENT DOCUMENTS

| | | | |
|---|---|---|---|
| 4,798,852 | * | 1/1989 | Zimmerman et al. ............... 522/96 |
| 4,902,440 | * | 2/1990 | Takeyama et al. ............. 252/182.18 |
| 4,985,523 | * | 1/1991 | Mochizuki et al. ................. 526/301 |
| 4,992,524 | * | 2/1991 | Coady et al. .......................... 528/49 |
| 5,093,386 | * | 3/1992 | Bishop et al. ......................... 522/96 |
| 5,146,531 | * | 9/1992 | Shustack .............................. 385/128 |
| 5,219,896 | * | 6/1993 | Coady et al. .......................... 522/96 |
| 5,229,433 | * | 7/1993 | Schunck et al. ...................... 522/96 |
| 5,336,563 | * | 8/1994 | Coady et al. ........................ 428/375 |
| 5,352,712 | * | 10/1994 | Shustack .............................. 522/31 |

FOREIGN PATENT DOCUMENTS 2 629 218   9/1989   (FR) .

OTHER PUBLICATIONS

Derwent Abstract, 90–10297/25, JP02053238, Feb. 22, 1990.

* cited by examiner

*Primary Examiner*—James J. Seidleck
*Assistant Examiner*—Sanza L. McClendon
(74) *Attorney, Agent, or Firm*—Pillsbury Madison & Sutro

(57) ABSTRACT

An optical glass fiber coating composition comprising:
(A) a urethane (meth)acrylate polymer,
(B) a (meth)acrylate compound represented by the following formula (1),

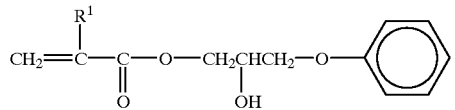

(1)

wherein $R^1$ is a hydrogen or a methyl group
(C) a reaction diluent, and
(D) a polymerization initiator.

The composition has superior storage stability over a long period of time and, at a cured state, exhibits excellent UV resistance, heat resistance, yellowing resistance, and oil resistance.

10 Claims, No Drawings

OPTICAL GLASS FIBER COATING COMPOSITIONS

This is a continuation of International Appln. No. PCT/NL95/00348 filed Oct. 11, 1995 which designated the U.S.

BACKGROUND OF THE INVENTION

1. Field of the Invention

The present invention relates to an optical glass fiber coating composition suitable for use as a primary coating on an optical glass fiber. More particularly this invention relates to an optical glass fiber coating composition having a low viscosity, exhibiting superior storage stability over an extended period of time, and providing a cured material having various excellent characteristics.

2. Description of Related Art

An optical fiber is provided with a resin coating with the object of protecting and reinforcing the bare optical fibers threads. The coating is applied immediately after hot melt spinning of the glass fiber. A structure consisting of a flexible primary coating layer on the surface of the optical fiber and a secondary coating layer outside of this primary coating layer is known as such a resin coating.

The coating material used to form these coatings must have the following characteristics:
(1) be a liquid at room temperature and have high processability;
(2) provide good productivity at a high curing rate;
(3) exhibit very little physical change during temperature changes over a wide range;
(4) have superior heat resistance and superior resistance to hydrolysis;
(5) show superior long term storage stability with little physical changes over time;
(6) show superior resistance to chemicals such as acids and alkalis;
(7) exhibit low moisture and water absorption;
(8) exhibit superior ultraviolet light (UV) resistance;
(9) have excellent oil resistance;
(10) generate a minimal amount of hydrogen gas which affects optical fibers
(11) have superb yellowing resistance against light and heat; and
(12) exhibit only slight shrinkage during curing.

A number of radiation-curable liquid resin compositions have been developed in an attempt to satisfy these requirements.

FR-A-2629218, for instance, describes an optical glass fiber coating composition suitable for use as a primary coating on an optical glass fiber, comprising a urethane acrylate oligomer and 15 to 40 weight % of isobornylacrylate as reactive acrylate diluent. The coating of FR-A-2629218 has a good adhesion to glass, gives suitable protection of the glass fiber and has a high curing speed.

In order to promote the productivity of optical fibers, it is essential that the drawing speed from melted glass fiber materials be elevated. At a high drawing speed, however, the conventional optical glass fiber coating compositions have a problem of generating a large quantity of volatile matters due to polymerization heat or radiation heat from radiation sources such as an ultraviolet lamp or the like.

U.S. Pat. No. 4,992,524 discloses an acrylate urethane oligomer, in combination with a reactive diluent and a photoinitiator. In the list of reactive diluents, at column 6, lines 1–42 2-hydroxy-3-phenoloxypropyl(meth)acrylate is mentioned. However, the disclosure of (U.S. Pat. No. 4,992, 524) is absent of any specific preference for this compound, nor is there any teaching which would lead the skilled man to use this compound, in combination with other reactive diluents, in order to make coating compositions that exhibit low weight reduction (of the liquid coating composition).

SUMMARY OF THE INVENTION

Accordingly, an objective of the present invention is to provide an optical glass fiber coating composition which has a low viscosity at room temperature, exhibits superior storage stability over a long period of time, produces a minimal amount of hydrogen, exhibits suitable adherence to optical fibers, generates a low amount of volatile matters when coated to optical fibers and cured, and in the cured state exhibits excellent UV-resistance, heat resistance, yellowing resistance, and oil resistance.

These objectives and other objectives is achieved in the present invention by the provision of an optical glass fiber coating composition comprising:
(A) a urethane (meth)acrylate polymer,
(B) a (meth)acrylate compound represented by the following formula (1):

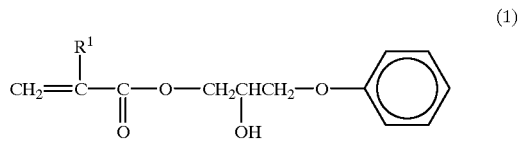

wherein $R^1$ is a hydrogen or a methyl group,
(C) a reaction diluent, and
(D) a polymerization initiator.

DETAILED DESCRIPTION OF THE INVENTION AND PREFERRED EMBODIMENTS

The urethane (meth)acrylate polymer (A) used in the present invention can be prepared, for example, by the condensation reaction of a polyol compound (a), a polyisocyanate compound (b), and a (meth)acrylate compound having a hydroxy group (c).

Examples of the polyol compound (a) are polyethylene glycol, polypropylene glycol, polytetramethylene glycol, polyhexamethylene glycol, polyheptamethylene glycol, polydecamethylene glycol, and polyester diols obtained by ring-opening copolymerization of two or more types of ionic-polymerizable cyclic compound.

Examples of ionic-polymerizable cylic compounds include cyclic ethers such as ethylene oxide, propylene oxide, butene-1-oxide, isobutene oxide, 3,3-bischloromethyloxetane, tetrahydrofuran, 2- or 3-methyltetrahydrofuran, dioxane, trioxane, tetraoxane, cyclohexene oxide, styrene oxide, epichlorhydrin, glycidyl methacrylate, acryl glycidyl ether, allyl glycidyl carbonate, butadiene monoxide, isoprene monoxide, vinyl oxetane, vinyl tetrahydrofuran, vinyl cyclohexene oxide, phenyl glycidyl ether, butyl glycidyl ether, and glycidylbenzoate. Specific examples of combinations of the two or more types of ionic-polymerizable cyclic compounds which can be given include tetrahydrofuran and propylene oxide; tetrahydrofuran and 2-methyltetrahydrofuran; tetrahydrofuran and ethylene oxide; propylene oxide and ethylene oxide; and butene oxide and ethylene oxide. Either random or block bonded ring-opening copolymers of these ionic-polymerizable cyclic compounds may be used.

These polyether polyols may be available as commercial products, such as PTMG 1000 and PTMG 2000 (Mitsubishi Chemical Industries, Ltd.); PPG 1000, EXCENOL 2020, EXCENOL 1020 (Asahi Oline); PEG 1000, UNISAFE DC 1100, UNISAFE DC 1800 (Nippon Oil and Fats Co., Ltd.); PPTG 2000, PPTG 1000, PTG 400, PTG 650, PTGL 2000, PTGL 4000, (Hodogaya Chemical Co., Ltd.); and Z-4441-1, PBG 2000A, PBG 2000B, Z-3001-4, Z-3001-5, Z-3001-9, Z-3001-15, (Dai-ichi Kogyo Seiyaku).

It is also possible to use a polyether diol obtained by the ring-opening copolymerization of the above mentioned ionic polymerizable cyclic compounds and a cyclic imine such as ethylene imine or the like; a cyclic lactone such as p-propiolactone, glycolic acid lactide, or the like; or dimethylcyclopolysiloxane, as the polyol compound (a).

Beside these polyether polyols, polyester polyols, polycarbonate polyols, and polycaprolactone polyols can be used. These polyols may be used in combination with polyether polyols (a). There are no specific limitations to the method of condensation of these structural units. They may be polymerized by random, block, or graft polymerization.

Examples of the polyester polyols which can be used include polyester polyols obtained by the reaction of a polyhydric alcohol, such as ethylene glycol, polyethylene glycol, propylene glycol, polypropylene glycol, glycerine, tetramethylene glycol, polytetramethylene glycol, 1,6-hexane diol, neopentyl glycol, 1,4-cyclohexanedimethanol, 3-methyl-1,5-pentane diol, 1,9-nonane diol, or 2-methyl-1, 8-octane diol, and a polybasic acid, such as phthalic acid, isophtalic acid, terephthalic acid, maleic acid, isophtalic acid, terephthalic aid, maleic acid, fumaric acid, adipic acid, or sebacic acid. Commercially available products which can be given include Kurapole P-2010, PMIPA, PKA-A, PKA-A2, and PNA-2000, all manufactured by Kuraray Co., Ltd.

As polycarbonate polyols, 1,6-hexane polycarbonate diol, and commercially available products, such as DN-980, DN-981, DN-982, DN-983 (Nihon Polyurethane), PC-8000 (PPG of the US), and PTHFCD 1000, PTHFCD 2000 (BASF) can be given as examples.

Further, examples of polycaprolactone polyols are those obtained by the reaction of ε-caprolactone and a diol, such as ethylene glycol, polyethylene glycol, propylene glycol, polypropylene glycol, glycerine, tetramethylene glycol, polytetramethylene glycol, 1,2-polybutylene glycol, 1,6-hexane diol, neopentyl glycol, 1,4-cyclohexanedimethanol, or 1,4-butane diol. These polycaprolactone polyols are commercially available as PLACSEL 205, 205AL, 212, 212AL, 220, and 220AL, all manufactured by Daicell Co., Ltd.

Polyols other than the above-described polyols can be used. These include ethylene glycol, propylene glycol, 1,4-butane diol, 1,5-pentane diol, 1,6-hexane diol, neopentyl glycol, 1,4-cyclohexanedimethanol, ethylene oxide addition compound to bisphenol A, butylene oxide addition compound to bisphenol A, ethylene oxide addition compound to bisphenol F, butylene oxide addition compound to bisphenol F, ethylene oxide addition compound to hydrogenated bisphenol A, butylene oxide addition compound to hydrogenated bisphenol A, ethylene oxide addition compound to hydrogenated bisphenol F, butylene oxide addition compound to hydrogenated bisphenol F, dimethylol compounds of dicyclopentadiene, tricyclodecanedimethanol, β-methyl-δ-valerolactone, polybutadiene with terminal hydroxy groups, hydrogenated polybutadiene with terminal hydroxy groups, castor oil denatured polyol, polydimethylsiloxane with terminal diols, and polydimethylsiloxane carbitol-denatured polyols.

In addition to the above-described combined use of polyols, diamines may be used together with the polyols. Examples of the diamines include ethylene diamine, tetramethylene diamine, hexamethylene diamine, paraphenylene diamine, 4,4-'diaminodiphenylmethane, diamines with hetero atoms, and polyether diamines. The amount of diamines used is usually 30 parts by weight or less for 100 parts by weight of the polyol.

Of these polyols, especially preferred are PTMG 1000, PTMG 2000 (Mitsubishi Chemical Industrie, Ltd.); PPG 1000, EXCENOL 2020, EXCENOL 1020, (Asahi Oline); PEG 1000, PPTG 2000, PPT 1000, PTG 400, PTG 650, PTGL 2000, PTGL 4000, (Hodogaya Chemical Co., Ltd.); Z-4441-1, PBG 2000A, PBG 2000B, Z-3001-4, Z-3001-5, Z-3001-9, Z-3001-15, (Dai-ichi Kogyo Seiyaku); Kurapole P-2010, PNA-2000 (Kuraray Co., Ltd.); DN-980, DN-981, DN-982, DN-983 (Nihon Polyurethane); PLACSEL 205, PLACSEL 205AL, PLACSEL 212, PLACSEL 212AL, PLACSEL 220, PLACSEL 220AL (Daicell Co., Ltd.); ethylene oxide addition compound to bisphenol A, ethylene oxide addition compound to bisphenol F, dimethylol compounds of dicyclopentadiene, tricyclodecanedimethanol, β-methyl-δ-valerolactone, and the like.

The number average molecular weight of these polyols is usually 100–20,000, preferably 200–12,000.

The polyisocyanate (b) used for the reaction includes, 2,4-tolylene diisocyanate, 2,6-tolylene diisocyanate, 1,3-xylylene diisocyanate, 1,4-xylylene diisocyanate, hydrogenated xylylene diisocyanate, 1,5-naphthalene diisocyanate, m-phenylen diisocyanate, p-phenylene diisocyanate, 3,3'-dimethyl-4,4'-diphenylmethane diisocyanate, 4,4'-diphenylmethane diisocyanate, hydrogenated diphenylmethane diisocyanate, 3,3'-dimethylphenylene diisocyanate, 4,4'-diphenylmethane diisocyanate, hydrogenated diphenylmethane diisocyanate, 3,3'-dimehylphenylene diisocyanate, 4,4'-biphenylene diisocyanate, 1,6-hexane diisocyanate, isophorone diisocyanate, methylene bis(4-cylcohexylisocyanate), 2,2,4-trimethylhexamethylene diisocyanate, 1,4-hexamethylene diisocyanate, bis(2-isocyanate-ethyl) fumarate, 6-isopropyl-1,3-phenyl diisocyanate, 4-diphenylpropane diisocyanate, and lysine diisocyanate. Of these, especially preferred are 2,4-tolylene diisocyanate, isophorone diisocyanate, 2,2,4-trimethylhexamethylene diisocyanate, 1,3-xylylene diisocyanate, hydrogenated xylylene diisocyanate, 4,4'-diphenylmethane diisocyanate, hydrogenated diphenylmethane diisocyanate, and the like.

These polyisocyanates may be used either singly or in combination of two or more.

Examples of the (meth)acrylate compound with a hydroxy group used for the reaction are 2-hydroxyethyl (meth)acrylate, 2-hydroxypropyl (meth)acrylate, 2-hydroxybutyl (meth)acrylate, 2-hydroxy-3-phenoxypropyl (meth)acrylate, 1,4-butanediol mono(meth)acrylate, 2-hydroxyalkyl (meth) acryloyl phosphate, 4-hydroxycyclohexyl (meth)acrylate, 1,6-hexanediol mono(meth)acrylate, neopentylglycol mono (meth)acrylate, trimethylolpropane di(meth)acrylate, trimethylolethane di(meth)acrylate, pentaerytritol tri(meth) acrylate, dipentaerythritol penta(meth)acrylate, (meth) acrylates represented by the following formula (3),

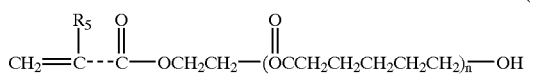

wherein $R_5$ is a hydrogen atom or a methyl group and n is an integer from 1–15, preferably 1–4. Compounds obtained by the addition polymerization of a glycidyl group-containing compound, such as alkyl glycidyl ether, allyl glycidyl ether, or glycidyl (meth)acrylate, and a (meth)acrylic acid can also be given as examples.

Among these (meth)acrylate compounds having hydroxy group, 2-hydroxyethyl (meth)acrylate, 2-hydroxypropyl (meth)acrylate, and the like are especially preferred.

These (meth)acrylate compounds having a hydroxy group (c) can be used either alone or in admixture of two ore more of them.

The polyol compounds (a), polyisocyanate compounds (b), and (meth)acrylate compounds having a hydroxy group (c) can be used at a proportion such that the isocyanate group contained in the polyisocyanate compounds (b) is 1.1–3 equivalent and the hydroxy group contained in the (meth)acrylate compounds having a hydroxy group (c) is 0.1–1.5 equivalent, for one equivalent of the hydroxy group contained in the polyol compounds (a).

Although there are no specific limitations to the method of condensation of the polyol compounds (a), polyisocyanate compounds (b), and (meth)acrylate compounds having a hydroxy group (c), the reaction can be carried out, for example, by the following methods (i)–(iv).

(i) All of polyol compounds (a), polyisocyanate compounds (b), and (meth)acrylate compounds containing a hydroxy group (c) are charged together in the reactor for the reaction.

(ii) Polyol compounds (a) and polyisocyanate compounds (b) are first reacted, and then the resulting reaction product is reacted with (meth)acrylate compounds containing a hydroxy group (c).

(iii) Polyisocyanate compounds (b) and (meth)acrylate compounds containing a hydroxy group (c) are first reacted, and then the resulting reaction product is reacted with polyol compounds (a).

(iv) Polyisocyanate compounds (b) and (meth)acrylate compounds containing a hydroxy group (c) are first reacted, then with polyol compounds (a), and the resulting reaction product is finally reacted again with (meth)acrylate compounds containing a hydroxy group (c).

It is desirable to use a urethanization catalyst in these reactions, such as copper naphthenate, cobalt naphthenate, zinc naphthenate, di-n-butyl tin laurate, triethylamine, triethylenediamine, or 2-methyltri-ethylenediamine, in an amount of 0.1–1 part by weight for 100 parts by weight of the total amount of the reaction component. The reaction temperature is 10–90° C., and preferably 30–80° C.

The number average molecular weight of urethane (meth)acrylate polymer (A) thus obtained is preferably 400–20,000, and especially preferably 700–10,000.

The amount of the urethane (meth)acrylate polymer (A) used in the composition of present invention is 5–90% by weight (hereinafter simply referred to as %), and especially preferably 20–80% by weight, in order to provide the composition with better coatability to optical fibers and a cured material with excellent flexibility.

The (meth)acrylate compounds (B) used in the present invention are compound represented by the above formulas (1). Specific examples of the compounds represented by formula (1) include 2-hydroxy-3-phenoxypropyl (meth)acrylate and the like, and commercial products, such as M-600A (Kyoei Yushi Chemical Co., Ltd.), Aronix M57000 (Toagosei Chemical Industries), and the like.

Incorporation of the (meth)acrylate compounds (B) assists to lower generation of volatile matters from the optical glass fiber coating composition of the present invention.

Further the compositions according to the invention may comprise as component (B) a compound of formula:

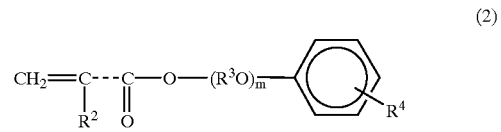

wherein $R^2$ is a hydrogen or a methyl group, $R^3$ is an alkylene group having 2–6 carbon atoms, $R^4$ is a hydrogen or alkyl group having 1–12 carbon atoms, and m is a number of 1–12. Examples of compounds according to formula (2) are nonylphenoxy polyethylene glycol (meth)acrylate, nonylphenoxy polypropylene glycol (meth)acrylate, phenoxyethyl (meth)acrylate, phenoxy diethylene glycol (meth)acrylate, phenoxy tetraethylene glycol (meth)acrylate, and phenoxy hexaethylene glycol (meth)acrylate, and commercial products, such as P-200A (Kyoei Yushi Chemical Co., Ltd.), Aronix M101, M102, M111, M113, M114, M117 (Toagosei Chemical Industries), NK-Ester AMP-20G, AMP-60G (Shin-Nakamura Chemical Industries), and the like.

These (meth)acrylate compounds (B) can be used either alone or in admixture of two or more of them, and incorporated in the composition of the present invention in an amount of 1–50%, especially 3–40% and more in particular 20–40%.

There are monofunctional compounds and polyfunctional compounds in reaction diluents used as component (C) in the present invention.

Examples of monofunctional compounds are 2-hydroxyethyl (meth)acrylate, 2-hydroxypropyl (meth)acrylate, 2-hydroxybutyl (meth)acrylate, methyl (meth)acrylate, ethyl (meth)acrylate, propyl (meth)acrylate, isopropyl (meth)acrylate, butyl (meth)acrylate, amyl (meth)acrylate, isobutyl (meth)acrylate, t-butyl (meth)acrylate, pentyl (meth)acrylate, isoamyl (meth)acrylate, hexyl (meth)acrylate, heptyl (meth)acrylate, octyl (meth)acrylate, isooctyl (meth)acrylate, 2-ethylhexyl (meth)acrylate, nonyl (meth)acrylate, decyl (meth)acrylate, isodecyl (meth)acrylate, undecyl (meth)acrylate, dodecyl (meth)acrylate, lauryl (meth)acrylate, octadecyl (meth)acrylate, stearyl (meth)acrylate, tetrahydrofurfuryl (meth)acrylate, butoxyethyl (meth)acrylate, ethoxydiethylene glycol (meth)acrylate, benzyl (meth)acrylate, cyclohexyl (meth)acrylate, phenoxyethyl (meth)acrylate, polyethylene glycol mono (meth)acrylate, polypropylene glycol mono(meth)acrylate, methoxyethylene glycol (meth)acrylate, ethoxyethyl (meth)acrylate, methoxypolyethylene glycol (meth)acrylate, methoxypolypropylene glycol (meth)acrylate, dicyclopentadiene (meth)acrylate, dicyclopentanyl (meth)acrylate, tricyclodecanyl (meth)acrylate, isobornyl (meth)acrylate, bornyl (meth)acrylate, N-vinylpyrrolidone, N-vinylcaprolactam, (meth)acryloyl morpholine, dimethylaminoethyl (meth)acrylate, diethylaminoethyl (meth)acrylate, 7-amino-3,7-dimenthyloctyl (meth)acrylate, hydroxybutyl vinyl ether, esters of maleic acid, esters of fumaric acid, and compounds represented by the following formulas (4) or (5)

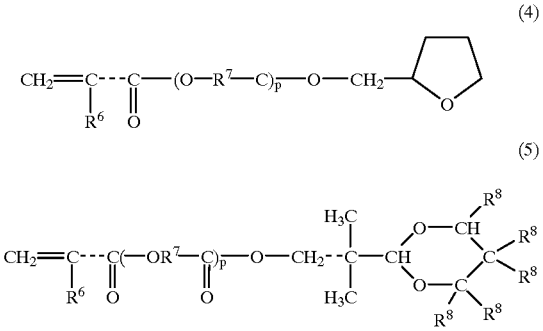

wherein R⁶ is a hydrogen atom or a methyl group; R⁷ is an alkylene group containing 2–8, preferably 2–5 carbon atoms; Re is a hydrogen atom or a methyl group, and p is an integer from 1–8, preferably 1–4.

Commercial products which can be given as examples of the monofunctional compounds include KAYARAD TC 110S, R629, R644 (Nippon Kayako Co., Ltd.), IBXA, BISCOAT 3700 (Osaka Organic Chemical Industry, Ltd.), and the like.

Examples of polyfunctional compounds include trimethylolpropane tri(meth)acrylate, pentaerythritol (meth)acrylate, ethylene glycol di(meth)acrylate, tetraethylene glycol di(meth)acrylate, polyethylene glycol di(meth)acrylate, 1,4-butanediol di(meth)acrylate, 1,6-hexanediol di(meth)acrylate, neopentyl glycol di(meth)acrylate, trimethylolpropanetrioxyethyl (meth)acrylate, tris(2-hydroxyethyl) isocyanurate tri(meth)acrylate, tris(2-hydroxyethyl) isocyanurate di(meth)acrylate tricyclodecanedimethanol di(meth)acrylate, and epoxy (meth)acrylate which is an addition compound of (meth)acrylate to bisphenol A glycidyl ether, triethylene glycol divinyl ether, and the like. Commercial products which can be given as examples include COPIMER-UV, SA1002, SA2007 (Mitsubishi Petrochemical Co., Ltd.), BISCOAT 700 (Osaka Organic Chemical Industry Ltd.), KAYARAD R-604, DPCA-20, DPCA-30, DPCA-60, DPCA-120, HX-620, D-310, D-330, (Nippon Kayaku Co., Ltd.), ARONIX M210, M215, M315, M325 (Toagosei Chemical Industry Co., Ltd.), and the like.

The molecular weight of these reaction diluents is usually about 200–3,000.

These reaction diluents can be used either alone or in admixture of two or more. These are incorporated in the optical glass fiber coating composition of the present invention in an amount of 5–60%, especially preferably 10–40%.

Radical polymerization initiators and photopolymerization initiators can be given as the polymerization initiator (D) used in the present invention.

Radical polymerization initiators are used when the composition of the present invention is cured by heat. Examples which can be given of the radical polymerization initiator include peroxides and azo compounds, such as benzoyl peroxide, t-butyloxybenzoate, and azobisisobutylonitrile.

Photopolymerization initiator is used when the composition of the present invention is cured by radiation. Here, radiation means infrared lights, visible light, ultraviolet light, and ionic radiations such as X-rays, electron beams, α-rays, β-rays, and γ-rays. Examples of the photopolymerization initiator are 1-hydroxyclohexyl phenyl ketone, 2,2-dimethoxy-2-phenylacetophenone, xanthone, fluorenone, benzaldehyde, fluorene, anthraquinone, triphenylamine, carbazole, 3-methylacethophenone, 4-chlorobenzophenone, 4,4-dimethoxybenzophenone, 4,4-diaminobenzophenone, Michler's ketone, benzoin propyl ether, benzoin ethyl ether, benzyl dimethyl ketal, 1-(4-isopropylphenyl)-2-hydroxy-2-methylpropane-1-on, 2-hydroxy-2-methyl-1-phenylpropane-1-on, thioxanthone, diethylthioxanthone, 2-isopropylthioxanthone, 2-chlorothioxanthone, 2-methyl-1 (4-(methylthio)phenyl)-2-morpholinopropane-1-on, and 2,4,6-trimethylbenzoyldiphenylphosphine oxide. IRUGACURE 184, 651, 907, CGI369, CG24-61 (Ciba Geigy); Lucirin LR8728 Initiator 654 (BASF); Darocur 1116, 1173 (Merck Co.); and Ubecryl P36 (UCB Co.) are given as commercially available photopolymerization initiators.

These polymerization initiators are incorporated in the composition of the present invention in an amount of preferably 0.1–10%, and especially preferably 0.1–5%.

A specifically useful optical glass fiber coating composition comprises:

40–60 weight % of (A),
15–45 weight % of (B),
and as component (C):
0.1–10 weight % isobornyl acrylate
0.1–10 weight % lauryl acrylate
0.1–10 weight % N-vinylcaprolactam
0.1–5 weight % of (D).

Besides urethane (meth)acrylate polymers (A), (meth) acrylate compounds (B), reaction diluents (C), and polymerization initiators (D), other radiation curable polymers, photosensitizers, and other additives can be optionally incorporated in the composition of the present invention.

Polyester (meth)acrylates, epoxy (meth)acrylates, polyamide (meth)acrylates, siloxane polymers having (meth) acryloyyloxy group, and the like can be given as the other radiation curable polymers. These other radiation curable polymers can be used in an amount of less than 50% of the composition.

Photosensitizers are optionally added in the case where the photopolymerization initiators are used. Given as examples of photosensitizers are triethylamine, diethylamine, N-methyldiethanolamine, ethanolamine, 4-dimethylaminobenzoic acid, ethyl 4-dimethylaminobenzoate, ethyl4-dimethylaminobenzoate, isoamyl 4-dimethylaminobenzoate, and commercially available products such as Ubercryl P102, P103, P104, and P105 manufactured by UCB Co.

These photosensitizers are used in an amount of less than 10% of the composition of the present invention.

Further, in addition to the above components, polymers or oligomers can be added as additives. Such polymers of oligomers include epoxy resin, polyamide, polyamideimide, polyurethane, polybutadiene, chloroprene, polyether, polyester, pentadiene derivatives, styrene/butadiene/styrene block copolymer, styrene/ethylene/butene/styrene block copolymer, styrene/isoprene/styrene block copolymer, petroleum resin, xylene resin, ketone resin, fluorine-containing oligomer, silicone oligomer, polysulfide oligomer, and the like.

Beside the above components, the composition of the present invention may be formulated with various components, as required, such as antioxidants, UV-absorbers, photo-stabilizers, silane coupling agents, antioxidants, thermal polymerization inhibitors, coloring matters, leveling agents, surface active agents, preservatives, plasticizers, lubricants, solvents, fillers, wettability improvers, and coating surface improvers. Antioxidants which can be commercially available include Irganox 1010, 1035, 1076, 1222 (manufactured by Ciba Geigy), and the like. As UV absorbers Tinuvin P, 234, 320, 326, 327, 328, 213 (manufactured by Ciba Geigy), Sumisorb 110, 130, 140, 220, 250, 300, 320, 340, 350, 400 (manufactured by Sumitomo Chemical Industries Co., Ltd.), and the like are given as examples. Photo-stabilizers which can be added include Tinuvin 292, 144, 622LD (manufactured by Ciba Geigy), and Sanol LS700, LS765, LS292, LS2626, LS1114, lS744 (manufactured by Sankyo Chemical Co.). Examples of silane coupling agents which can be given are γ-aminopropyltriethoxysilane, γ-mercaptopropyltrimethoxysilane, γ-methacryloxypropyltrimethoxysilane, and commercial products such as SH6062, SZ6030 (manufactured by Toray Silicone Co.) and KBE903, 603, 403 (manufactured by Sin-etsu Silicone Co.). Commercially available antioxidants include Antigene W, S, P, 3C, 6C, RD-G, FR, and AW (manufactured by Sumitomo Chemical Co.).

The liquid curable resin compostion of the present invention can be prepared by blending these components by a conventional method. The viscosity of the composition thus prepared is normally 200 to 20,000 cps at 25° C., and preferably 1,500 to 10,000 cps at 25° C.

The weight reduction of the optical glass fiber coating composition of the present invention, when allowed to stand for 24 hours at a reduced pressure of smaller than 4 kPa (30 mmHg) at 50–60° C., is preferably 5% or less, and particularly preferably less than 4%. If the weight reduction is more than 5%, the optical glass fiber coating composition generates a large amount of volatile matters due to polymerization heat, radiation heat, or the like during curing when the composition is coated to optical fibers. The volatile matters may adhere to UV lamps or coating cups an the like which are parts of optical fiber coating apparatus, causing decrease in the intensity of the light from UV lamp. This tends to decrease the degree of curing of the resin composition. In addition, the volatile matters may attach to the composition in the coating cup and contaminates it or adversely affects the working environment. In order to alleviate this problem, the following measures should be taken to the extent other required characteristics are not impaired; (1) to increase the proportion of the (meth)acrylate compound (B), (2) to use a high boiling compound as the proportion of the components is preferably adjusted by suitably combining these measures (1)–(3).

EXAMPLES

The present invention will now be explained with reference to the following examples, which are in no way limitative of the scope of the invention. In the examples below "parts" means "parts by weight".

Preparation of urethane acrylate 1 (A-1)

In a reaction vessel equipped with a stirrer were charged 228.1 g of 2,4-tolylene diisocyanate, 1699.8 g of a ring-opening copolymer of tetrahydrofuran and 3-methyltetrahydrofuran, having a number average molecular weight of 2,000, and 0.5 g of 2,6-di-t-butyl-methylphenol, as a polymerization inhibitor. After cooling the mixture to a temperature of below 10° C. in an ice water bath, 1.6 g of dibutyltindilaurate was added to initiate the reaction. The reaction was carried out for 2 hours while controlling the temperature at 20–35° C. Then, after the addition of 20.4 g of γ-mercaptopropyltrimethoxysilane, the mixture was stirred for a further one hour at 35–40° C., whereupon 89.3 of hydroxyethyl acrylate was added, followed by stirring for 5 hours at 40–60° C., to obtain liquid urethane acrylate (A-1) having a number average molecular weight of 4,750.

Example 1

50.0 parts of urethane acrylate (A-1), 5.0 parts of isobornyl acrylate, 6.0 parts of N-vinylcaprolactam, 10.2 parts of M113 (manufactured by Toagosei Chemical Industry Co.), 7.0 parts of lauryl acrylate, 21.6 parts of 2-hydroxy-3-phenoxypropyl acrylate (M-600A, trademark, manufactured by Kyoei Yushi Chemical Co., Ltd.), 1.5 parts of 2,4,5-trimethylbenzoyldiphenylphosphine oxide (as a photopolymerization initiator), 0.3 part of Irganox 1035 (as an antioxidant), 0.7 part of γ-mercaptopropyltrimethoxysilane (as a silane coupling agent), and 0.1 part of diethylamine (as a photosensitizer) were charged to a reaction vessel equipped with a stirrer and stirred at 50–60° C. to produce an optical glass fiber coating composition of the present invention.

Example 2

50.0 parts of urethane acrylate (A-1), 5.0 parts of isobornyl acrylate, 6.0 parts of N-vinylcaprolactam, 7.0 parts of lauryl acrylate, 29.1 parts of M-600A, 1.5 parts of 2,4,6, trimethylbenzoyldiphenylphosphine oxide (as a photopolymerization initiator), 0.3 part of Irganox 1035 (as an antioxidant), and 0.1 part of diethylamine (as a photosensitizer) were charged to a reaction vessel equipped with a stirrer and stirred at 50–60° C. to produce an optical glass fiber coating composition of the present invention.

Example 3

50.0 parts of urethane acrylate (A-1), 5.0 parts of isobornyl acrylate, 6.0 parts of N-vinylcaprolactam, 7.0 parts of lauryl acrylate, 39.1 parts of M-600A, 1.5 parts of 2,4,6,-trimethylbenzoyldiphenylphosphine oxide (as a photopolymerization initiator), 0.3 part of Irganox 1035 (as an antioxidant), and 0.1 part of diethylamine (as a photosensitizer) were charged to a reaction vessel equipped with a stirrer and stirred at 50–60° C. to produce an optical glass fiber coating composition of the present invention.

Example 4

50.0 parts of urethane acrylate (A-1), 15.2 parts of isobornyl acrylate, 6.0 parts of N-vinylcaprolactam, 7.0 parts of lauryl acrylate, 23.9 parts of M-600A, 1.5 parts of 2,4,6, trimethylbenzoyldiphenylphosphine oxide (as a photopolymerization initiator), 0.3 part of Irganox 1035 (as an antioxidant), and 0.1 part of dithylamine (as a photosensitizer) were charged to a reaction vessel equipped with a stirrer and stirred at 50–60° C. to produce an optical glass fiber coating composition of the present invention.

Comparative Example 1

50.0 parts of urethane acrylate (A-1), 34.1 parts of isobornyl acrylate (as a reaction diluent), 6.0 parts of N-vinylcaprolactam, 7.0 parts of lauryl acrylate, 1.5 parts of 2,4,6, trimethylbenzoyldiphenylphosphine oxide (as a photopolymerization initiator), 0.3 part of Irganox 1035 (as an antioxidant), 0.7 part of γ-mercaptopropyltrimethoxysilane (as a silane coupling agent), and 0.1 part of dithylamine (as a photosensitizer) were charged to a reaction vessel equipped with a stirrer and stirred at 50–60° C. to produce an optical glass fiber coating composition Test Examples (1) The rate of weight reduction, (2) T-peel strength, and (3) generation of volatile matters when optical fibers are cured were evaluated on the compositions obtained in Examples 1–4 and Comparative Example 1. The results are shown in Table 1.

(1) Weight reduction test

About 10 g of the sample was weighed (Wo), placed in a bottle, left to stand at a reduced pressure of 30 mmHg or lower and at 50° C. for 24 hours, and weighed again (Wf). The rate of weight reduction (Wr %) was capsulated according to the following formula.

$$Wr = \frac{Wo - Wf}{Wo} \times 100$$

(2) Measurement of T-peel strength

The composition was applied to a quartz glass plate using a 150 μm applicator and irradiated with ultraviolet rays at 100 mJ/cm² under a nitrogen atmosphere to produce a cured film. The cured film, as attached to quartz glass plate, was conditioned at 23° C. and 50% RH for 24 hours to obtain a test specimen. The film was cut on the quartz glass plate to a width of 1 cm and the T-peel strength (g/cm) was measured using a peel tester, Shimazu Autograph AGS-1KND Type-1 (Shimazu Manufacturing Co.) at a cross head speed of 50 mm/min.

(3) Generation of volatile matters

Generation of volatile matters when the compositions are coated to optical fibers and cured was evaluated using an optical fiber drawing device (manufactured by Yoshida Industry). The compositions prepared in Examples and Comparative Examples were used as a primary coating and an optical glass fiber coating composition manufactured by Japan Synthetic Rubber Co. was used as a secondary coating.

The optical fiber drawing conditions was adjusted to make a diameter of 150 μm as the optical fiber itself, 200 μm after the primary coating, and 260 μm after the secondary coating. The drawing speed was 120 mm/min. A 3.5 kW UV lamp SMX (manufactured by ORC Co.) was used as the UV irradiation device when for curing the compositions coated to the optical fiber. A stream of nitrogen gas was purged at a rate of 10 l/min to the quartz tube in the UV irradiation apparatus through which optical fiber was passed. Vapor generation at the time of curing the primary coating by the UV curing apparatus was evaluated by naked eye observation of absence or presence of vapor accompanied when the optical fiber comes out of the UV curing apparatus.

The optical glass fiber coating composition for optical fibers of the present invention has superior storage stability over a long period of time, exhibits excellent processability when coated to optical fibers, produces a minimal amount of vapors, exhibits superb adherence to optical fibers, and at a cured state exhibits excellent UV resistance, heat resistance, yellowing resistance and oil resistance.

Therefore, the optical fiber comprising a primary coating of a suitable cured optical glass fiber coating composition according to the invention is suitably used with a secondary coating.

What is clamed is:

1. An optical glass fiber coating composition comprising:
   (A) a urethane (meth)acrylate polymer,
   (B) a (meth)acrylate compound represented by the following formula (1):

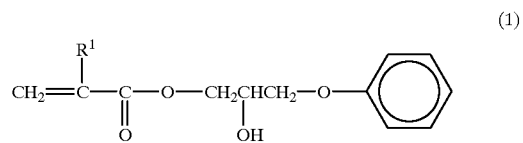

wherein $R^1$ is hydrogen or a methyl group,
   (C) a reactive diluent, and
   (D) a polymerization initiator
wherein the composition comprises, relative to the total coating composition:
   5–90 weight % of (A)
   20–50 weight % of (B)
   5–60 weight % of (C), and
   0.1–10 weight % of (D), and
wherein the weight reduction, when allowed to stand for 24 hours at a reduced pressure of smaller than 4 kPa (30 mm Hg) at 50° C., is 5% or less.

2. An optical glass fiber coating composition according to claim 1, wherein the composition comprises, relative to the weight of the total composition:
   20–80 weight % of (A),
   3–40 weight % of (B),
   10–40 weight % of (C), and
   0.1–5 weight % of (D).

TABLE 1

| | | Examples | | | | Comparative Examples |
|---|---|---|---|---|---|---|
| Evaluation Item | | 1 | 2 | 3 | 4 | 1 |
| (A) | urethane acrylate (A-1) (parts) | 50.0 | 50.0 | 50.0 | 50.0 | 50.0 |
| (B) | (meth)acrylate compound (parts) | | | | | |
| | 2-hydroxy-3-phenoxypropyl acrylate | 21.6 | 29.1 | 39.1 | 23.9 | 0.0 |
| | M113 | 10.2 | 0.0 | 0.0 | 0.0 | 0.0 |
| (C) | Reaction diluent (parts) | | | | | |
| | isobornyl acrylate | 5.0 | 5.0 | 5.0 | 15.2 | 34.1 |
| | lauryl acrylate | 7.0 | 7.0 | 7.0 | 7.0 | 7.0 |
| | N-vinylcaprolactam | 6.0 | 6.0 | 6.0 | 6.0 | 6.0 |
| (D) | Polymerization initiator (parts) | | | | | |
| | 2,4,6-trimethylbenzoyl-diphenylphosphine oxide | 1.5 | 1.5 | 1.5 | 1.5 | 1.5 |
| Weight reduction (%) | | 3.4 | 3.0 | 2.8 | 3.5 | 7.5 |
| T-peel strength (g/cm) | | 130 | 124 | 120 | 130 | 120 |
| Vapor generated during application to optical fibers and curing | | No vapor generated | | | | Vapor generated |

3. An optical glass fiber coating composition according to claim 1, wherein the composition comprises, relative to the weight of the total composition:

20–80 weight % of (A),
20–40 weight % of (B),
10–40 weight % of (C), and
0.1–5 weight % of (D).

4. An optical glass fiber coating composition according to claim 1, wherein the composition further comprises as component (B) a (meth)acrylate compound represented by formula

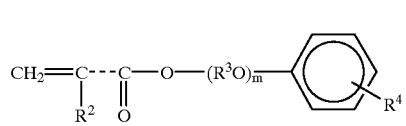

(2)

wherein $R^2$ is a hydrogen or a methyl group, $R^3$ is an alkylene group having 2–6 carbon atoms, $R^4$ is a hydrogen or alkyl group having 1–12 carbon atoms, and m is a number of 1–12.

5. An optical glass fiber coating composition according to claim 1, wherein (B) is 2-hydroxy-3-phenoxypropyl acrylate.

6. An optical glass fiber coating composition according to claim 1, wherein the composition comprises, relative to the total weight of the composition:

40–60 weight % of (A),
20–45 weight % of (B);
and as component (C) a mixture comprising:
0.1–10 weight % isobornyl acrylate,
0.1–10 weight % lauryl acrylate, and
0.1–10 weight % N-vinyl caprolactam; and
0.1–5 weight 5 of (D).

7. An optical fiber comprising a primary coating of a suitable cured optical glass fiber coating composition according to claim 1, and a secondary coating.

8. An optical fiber according to claim 7, wherein the weight reduction of said composition, when allowed to stand for 24 hours at a reduced pressure of smaller than 30 mmHg at 50° C., is less than 4%.

9. An optical fiber comprising a primary coating of a suitable cured optical glass fiber coating composition according to claim 1, and a secondary coating.

10. The composition of claim 1, wherein the weight reduction of the composition, when allowed to stand for 24 hours at a pressure of smaller than 4 kPa (30 mmHg) at 50° C., is 4% or less.

* * * * *